United States Patent Office 3,546,589

Patented Dec. 8, 1970

3,546,589

FREQUENCY CHARACTERISTIC SHAPING CIRCUITS

Michael John Gingell, Harlow, England, assignor to International Standard Electric Corporation Filed June 1, 1967, Ser. No. 645,093
Claims priority, application Great Britain, June 3, 1966, 24,792/66
Int. Cl. H04b 1/00
U.S. Cl. 325—59 9 Claims

ABSTRACT OF THE DISCLOSURE

An N-path frequency translation system comprising a single polyphase modulation unit common to N inputs having N output paths which are identical and connected in parallel. Each of the N output paths which comprises a filter unit and at least one output modulator unit, sample in turn a given input frequency spectrum for a period of time determined by N. The input and output modulators are unbalanced. The output from the N output paths are summed to provide output frequency spectrums which are either an erect or inverted translation of the input frequency spectrum.

The invention relates to N-path frequency translation systems or frequency characteristic shaping circuits. Such systems are useful for providing frequency functions (certain bandpass characteristics) otherwise commonly provided by modulators and complicated filters.

The invention provides an N-path frequency translation system comprising an input polyphase modulator unit having N-output paths which are identical and connected in parallel, each of said output paths which comprises a filter unit and at least one output modulator unit sample in turn a given input frequency spectrum for a period of time determined by N, said input polyphase modulator unit and said output modulator units being unbalanced, the outputs of each of said output paths being connected to a summation unit the output frequency spectrums of which are either an erect or inverted translation of said input frequency spectrum.

According to one feature of the invention an N-path frequency translation system as detailed in the preceding paragraph is provided wherein said input frequency spectrum is band limited by providing a second filter unit which is interposed between said input and said input polyphase modulator unit.

According to another feature of the invention an N-path frequency translation system as detailed in the preceding paragraphs is provided wherein said input polyphase modulator unit comprises an N-pole, N-way rotary sampling switch and N-phase shift networks, each of said phase shift networks being connected between the input terminal and the wiper arm of one of said N-poles, wherein each of said wiper arms lags behind the preceding one by an amount $2\pi/N$ degrees, and wherein each of said phase shift networks lags behind the preceding one by an amount $2\pi/N$ degrees.

According to another feature of the invention an N-path frequency translation system as detailed in the preceding paragraphs is provided wherein said output modulator units are provided by a polyphase demodulator unit.

The foregoing and other features according to the invention will be understood from the following description with reference to the accompanying drawings in which.

Figure 1:
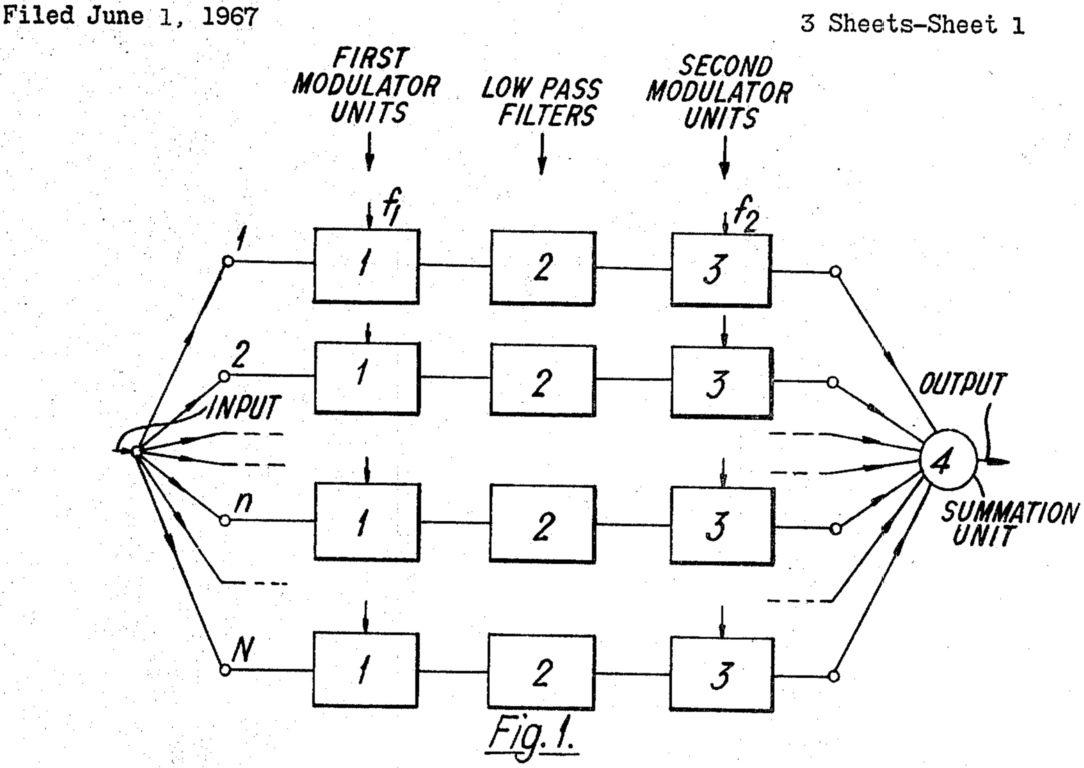
FIG. 1 shows a block diagram of the N-path configuration of a frequency translation system.

Referring to FIG. 1 a block diagram of the N-path configuration of a frequency translation system is shown, each path of which comprises a modulator unit 1 at a frequency $f_1$ which is the midband frequency of the input band of frequencies, a low pass filter unit 2 whose cut-off frequency is half the desired system bandwidth and a second modulator unit 3 at a frequency $f_2$ which is the midband frequency of the output band frequencies. The modulator units 1 and 3 being unbalanced.

This system is arranged to select a band of frequencies from a given input spectrum and to translate it either erect or inverted to a new frequency band, i.e. the output frequency band as obtained from the summation unit 4.

Considering only one path of the N-path system, the output signal is sampled by and passed through the input modulator unit 1. This modulator unit has a square wave signal applied to it so there will be a large number of frequency components appearing in the output circuit of the input modulator unit 1 but the only one of interest is the difference frequency between the input and modulator frequencies. Thus the output from the low pass filter unit 2 will be a single low frequency signal which is demodulated by the output modulator unit 3 before being passed to the summation unit 4.

All of the N-paths are physically identical and the modulator frequencies $f_1$ and $f_2$ have exactly the same waveform, the only difference being is that the modulator frequencies $f_1$ and $f_2$ are each delayed in time i.e. each of the modulator frequencies $f_1$ and $f_2$ is delayed by $T/N$ on the previous one, where N is the total number of paths and T is the period of oscillation.

Figure 2:
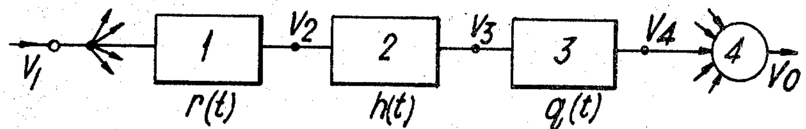
FIG. 2 shows a block diagram of the $n^{th}$-path of the frequency translation system shown in the drawing according to FIG. 1.

FIG. 2 shows a block diagram of the $n^{th}$ path of the system shown in the drawing according to FIG. 1, the input signal to the modulator unit 1 being represented as a voltage $V_1$ and the output signal as voltage $V_2$ which is also the input signal to the low pass filter unit 2. The output from the low pass filter unit 2 which is the input to the modulator unit 3 being represented as a voltage $V_3$ and the output from the modulator unit 3 (input to summation unit 4) being represented as a voltage $V_4$. The output of the system being represented by $V_0$.

The transfer function of each of the units may be expressed as a function of time $(t)$ in terms of the input and output voltages as follows:

$$V_2(t)=V_1(t) \text{ x } r(t) \quad (1)$$

$$V_3(t)=h(t) \text{ x } V_2(t) \quad (2)$$

$$V_4(t)=V_3(t) \text{ x } q(t) \quad (3)$$

where $r(t)$ is the transfer function of the modulator unit 1 $h(t)$ is the transfer function of the low pass filter unit 2 $q(t)$ is the transfer function of the modulator unit 3.

The modulating or switching functions are defined by the Fourier Series $$r(t)=\sum_{L=-\infty}^{L=+\infty} R_L e^{jw_1Lt} \quad (4)$$

$$R_L=\frac{1}{T}\int_{-T_{1/2}}^{T_{1/2}} r(t)e^{-jw_1Lt}dt \quad (5)$$

$$\omega_1=2\pi f_1=2\pi/T_1 \quad (6)$$

$$q(t)=\sum_{K=-\infty}^{K=+\infty} Q_K e^{j\omega_2Kt} \quad (7)$$

$$Q_K=\frac{1}{T_2}\int_{-T_{2/2}}^{+T_{2/2}} q(t)e^{-j\omega_2Lt}dt \quad (8)$$

$$\omega_2=2\pi f_2=2\pi/T_2 \quad (9)$$

where $R_L$ is the Fourier coefficient of $L^{th}$ term in expansion of input modulator switching functions.

$\omega_1=2\pi f_1$, i.e. angular rotation speed of input modulator
$\omega_2=2\pi f_2$, i.e. angular rotation speed of output modulator
$Q_K$ is the Fourier coefficient of $L^{th}$ term in expansion of output modulator switching function
$T_1$ is the period of the switching function of input modulator
$T_2$ is the period of the switching function of output modulator.

From Equations 1 and 4

$$V_2(t)=V_1(t)\sum_{L=-\infty}^{L=+\infty} R_L e^{j\omega_1Lt} \quad (10)$$

Taking the Laplace Transform of Equation 10 we have $$V_2(p)=\sum_{L=-\infty}^{L=+\infty} R_L V_1(p-Lp_1) \quad (11)$$

where $p$=the complex variable $j\omega$
$p1$=the complex variable $j\omega_1$

Hence $$V_3(p)=\sum_{L=-\infty}^{L=+\infty} R_L H(p-Lp_1)V_1(p-Lp_1) \quad (12)$$

where $H(p)$ is the Laplace Transform of the transfer function $h(p)$ of the low pass filter unit And $$V_4(p)=\sum_{L=-\infty}^{L=+\infty}\sum_{K=-\infty}^{K=+\infty} R_LQ_KH(p-Lp_1)V_1(p-Lp_1-Kp_2) \quad (13)$$

where $p_2$=the complex variable $j\omega_2$

Finally $$V_0(p)=\sum_{n=1}^{n=N} V_0(p) \quad (14)$$

Considering the general term in the infinite output spectrum of $Vo(p)$, i.e.

$$\sum_{n=1}^{n=N} R_LQ_KH(p-Lp_1)V_1(p-Lp_1-Kn_2) \quad (15)$$

Figure 3:
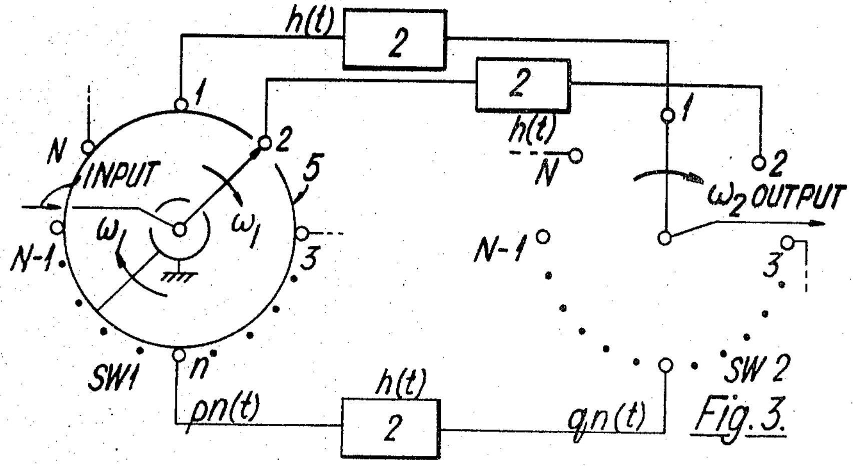
FIG. 3 shows a block diagram of a practical circuit for realisation of the N-path configuration of the frequency translation system shown in the drawing according to FIG. 1.

Referring to FIG. 3, a block diagram of a practical circuit for realization of the N-path configuration of a frequency translation system is shown, the two modulators in each path being replaced by rotary sampling switches SW1 and SW2.

It should be noted that to define the modulator conditions the input modulator has a shorting ring 5 which rotates in synchronism with the switch and earths the inputs to all the low pass filter units 2 except the one which makes contact with the input switch SW1.

Figure 4:
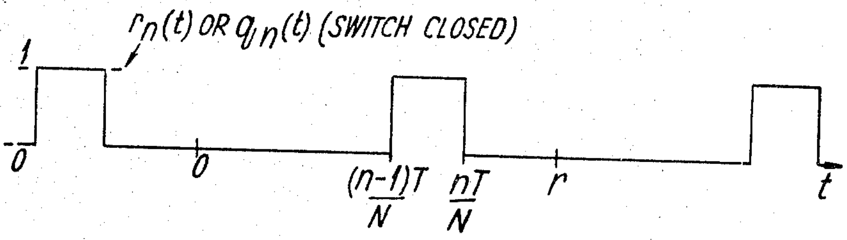
FIG. 4 shows a waveform which expresses the function of the modulator shown in the drawing according to FIG. 3.

If the dwell time on each contact is $T/N$ where N is the number of paths, and T is the time for one switch revolution then the modulator function can be expressed as shown in FIG. 4.

Then $$R_L=\frac{1}{T_1}\int_{-T_{1/2}}^{+T_{1/2}} e^{-j\omega_1Lt}r(t)dt \quad (17)$$

$$=\left[\frac{e^{-j\omega_1Lt}}{-j\omega_1LT_1}\right]_{\frac{n-1}{N}T_1}^{\frac{n}{N}T_1} \quad (18)$$

$$=\frac{\sin\frac{\pi L}{N}e^{-j\pi L\frac{(2n-1)}{N}}}{\pi L} \quad (19)$$

Let $$X_L=\frac{\sin\frac{\pi L}{(N)}}{\pi L} \quad (20)$$

Then $$R_L=X_Le^{-j\pi L\left(\frac{2n-1}{N}\right)} \quad (21)$$

Similarly $$Q_K=X_Ke^{-j\pi K\left(\frac{2n-1}{N}\right)} \quad (22)$$

Then $$\sum_{n=1}^{n=N} R_LQ_K=X_LX_K\sum_{n=1}^{n=N} e^{-j\pi\left[\frac{(2n-1)(K+L)}{N}\right]} \quad (23)$$

Let $K+L=mN$ where $m$ is an integer

Then $$\sum_{n-1}^{n=N} R_LQ_K=X_LX_K\sum_{n=1}^{n=N} e^{-j\pi m(2n-1)} \quad (24)$$

Now $$\sum_{n=1}^{n=N} e^{-j\pi m(2n-1)}=e^{jmu}+e^{-j2\pi m}+e^{-j5\pi m}+\dots+e^{-j\pi m(2N-1)}$$

$$=(-1)^mN \text{ if } K+L=mN$$

If $K+L=mN$ then $\Sigma=0$

Hence $$V_{0(p)}=N\Sigma\{(-1)^mX_LX_KH(p-Lp_1)V_1[p-Lp_1-(mN-L)p_2]\} \quad (25)$$

With certain band limiting restrictions on the input and output the only case of interest is when $$m=0 \quad L=1 \quad K=-1$$

and in this case $$V_o(p)=NX_1X_{-1}H(p-p_1)V_1(p-p_1+p_2) \quad (26)$$

$$=\frac{N_2}{\pi}\sin^2\left(\frac{\pi}{N}\right)H(p-p_1)V_1(p-p_1+p_2) \quad (27)$$

This is the original band translated from $$(f_1-f_c)<f_{in}<(f_1+f_c) \text{ to } (f_2-f_c<f_{out}\ll(f_2+f_c)$$

i.e., the "upper sideband" where $f_c$ is the low pass filter cut-off frequency=half the system bandwidth.

The band limiting restrictions depend on the number of paths and the width of the band that it is desired to translate.

Considering Equation 25 the two bands which are generated at the output and which are nearest to the desired output band are those for $L=0$, $K=0$ and $L=1$, $K=N-1$. This is shown in the drawing according to FIG. 5 which illustrates part of the output spectrum of the frequency translation system.

Figure 5:
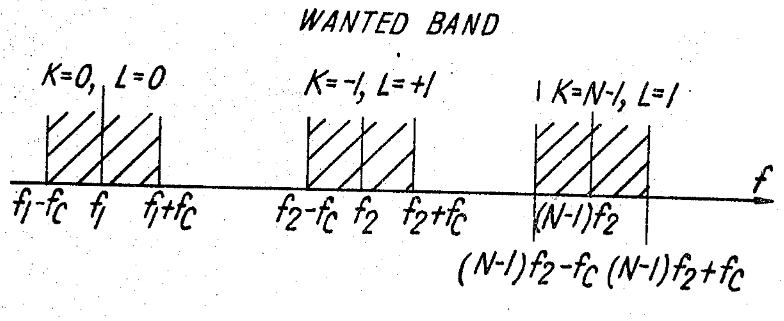
FIG. 5 shows part of the output spectrum of a frequency translation system.

Hence from FIG. 5

$$f_1+f_c \ll f_2-f_c$$

or $$f_c \ll \frac{f_2-f_1}{2} \tag{28}$$

Also $$(N-1)f_2-f_c > f_2+f_c \therefore N > 2(1+f_c/f_2) \tag{29}$$

The output from the system must therefore be band limited with a band pass filter unit such that $$f_1+f_c < f < (N-1)f_2-f_c$$

To obtain the "lower sideband" i.e. the original band translated and inverted it is only necessary to reverse the direction of rotation of one of the modulator rotary switches SW1 and SW2 shown in the drawing according to FIG. 3.

For example, if the direction of rotation of the modulator rotary switch SW1 shown in the drawing according to FIG. 3 were reversed then $$R_L = X_L e^{-j\pi L\left[\frac{2N-(2n-1)}{N}\right]} \tag{30}$$

and if $K-L=mN$ the $$\sum_{n=1}^{n=N} R_L Q_K = (-1)^m N X_L X_K \tag{31}$$

otherwise it will equal zero.

Hence again with band limiting restrictions we have $$V_o(p) = N X_1^2 H(p-p_1) V_1(p-p_1-p_2)$$
$$= -\frac{N}{\pi} \sin^2\left(\frac{\pi}{N}\right) H (p-p_1) V_1(p_1+p_2-p) \tag{32}$$

which is the original band translated and inverted.

This is a very useful facility. As an example consider the case where the input band extends from zero to $2f_1$ i.e. an "audio" input, it is then possible to generate either the upper or lower sideband centred on $f_2$ with the same equipment. The process is, of course, reversible.

In order to remove the first unwanted product, i.e. the one corresponding to $L=-1$, it is necessary to provide supplementary polyphase modulation or quadrature modulation. The product $L=-1$ is at a frequency $f+f_1$ which is the upper sideband produced by the modulation of the input signal against the fundamental component $f_1$ of the input multiplier function.

By using supplementary modulation the low pass filter requirements are considerably reduced and a suppression of the unwanted signal of approximately 30 to 40 db is obtained.

Figure 6:
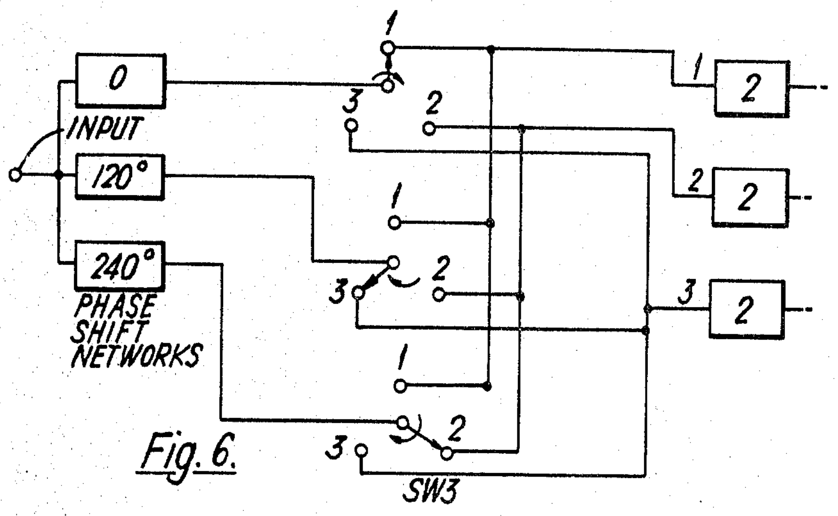
FIG. 6 shows a block diagram of a practical circuit for part of a three-way frequency translation system for realisation of supplementary polyphase modulation.

Referring to FIG. 6 is a block diagram of a practical circuit for part of a 3-way frequency translation system for realisation of supplementary polyphase modulation is shown, the unbalanced input modulators 1 shown in the drawing according to FIG. 1 being replaced by a 3-pole, 3-way rotary sampling switch SW3.

Interposed between the input terminal and each of the 3 poles of the switch SW3 are phase shift networks which are connected to the wiper arms of the three poles of the switch SW3. Each wiper arm lags behind the preceding one by an amount $2\pi/N$ degrees and each phase shift network lags behind the preceding one by an amount $2\pi/N$ degrees. Therefore in the 3-path system the wiper arm and the associated phase shift network lag behind the preceding ones by 120°.

The low pass filter units 2 in each of the three paths are connected to their respective output terminals 1, 2, and 3 on all of the three poles of the switch SW3.

Figure 7:
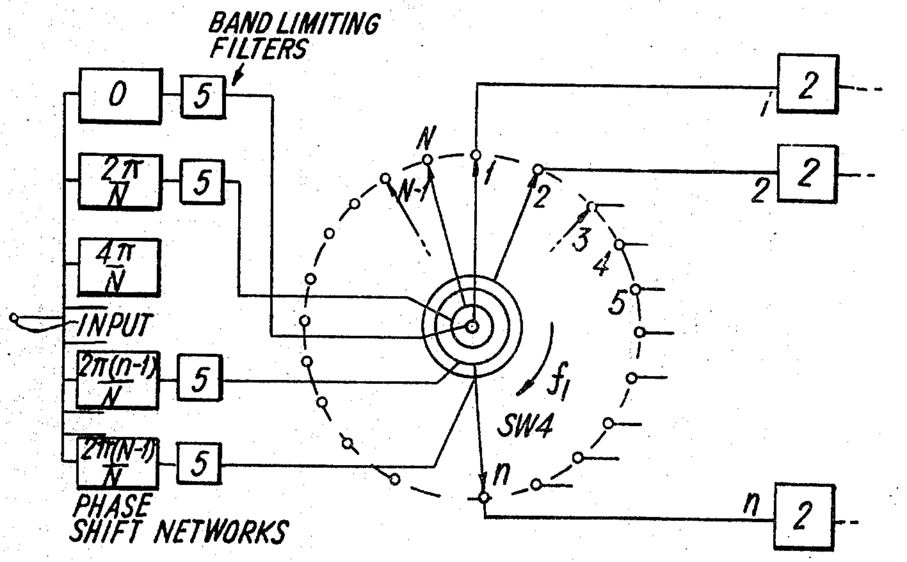
FIG. 7 shows a block diagram of a part of a practical circuit for the general case for realisation of supplementary polyphase modulation.

The general case for realisation of supplementary polyphase modulation is illustrated in the drawing according to FIG. 7, the switch SW3 in the drawing according to FIG. 6 being replaced by an N-pole, N-way rotary sampling switch SW4.

Considering the general case, the input voltage to the first low pass filter is given by $$V_2 = \left[\sum_L R_{L_1} V_1(p-Lp_0)\right]\left[\sum_{n=1}^{n=N} e^{-j2\pi\left[\frac{L-1}{n}\right](L-1)}\right] \tag{33}$$

$$\therefore V_2 = N \sum_L R_{L_1} V_1(p-Lp_o) \tag{34}$$

if $L-1=m_1N$ for unbalanced systems
or if $L-1=2m_1N$ for balanced systems
where $m_1$=an integer
but $V_2=0$ otherwise.

Thus the output voltage for the whole system is given by $$V_0 = N^2 \sum_{\substack{L=-\infty \\ K=-\infty}}^{\substack{L=+\infty \\ K=+\infty}} R_{L_1} Q_{K_1} H(p-Lp_1) V_1(p-Lp_1-Kp_2) \tag{35}$$

with $\left.\begin{matrix} L-1=m_1N \\ K+L=mN \end{matrix}\right\}$ for unbalanced systems (36)

and $\left.\begin{matrix} L-1=2m_1N \\ K+L=2mN \end{matrix}\right\}$ for balanced systems (37)

∴ provided N exceeds 2 for unbalanced systems and 1 for balanced systems L can never take the value −1.

Although the system described with reference to the drawings according to FIGS. 6 and 7 will give sufficient suppression of the $f+f_1$ term there will only be a limited suppression of the input signals which extend beyond the range $0\text{–}2f_1$.

When the input frequency $f$ is greater than $2f_1$ the difference signals $f-f_1$ will exceed $f_1$. This difference signal which is the signal it is normally required to pass suffers no attenuation from the polyphase modulation and will suffer only a limited attenuation from the low pass filters in the N paths. It is therefore necessary to insert an input band limiting filter between the input and the polyphase modulator unit such that the sum of the losses of the band limiting filter and that of one of the identical filters in the N paths meets the system requirements.

For example, if the system requirement is 60 db suppression of all signals outside the wanted output band this may be shared as follows:

Filters in the N paths:

pass $0-f_1$ stop $>f_1$ by 30 db

Input band limiting filter:

pass $0-2f_1$ stop $>2f_1$ by 30 db

Phase shift networks:

pass $0\text{–}2f_1$ with a phase accuracy sufficient to give 30 db single sideband suppression.

While the principles of the invention have been described above in connection with specific apparatus and applications, it is to be understood that this description is made only by way of example and not as a limitation on the scope of the invention.

What is claimed is:

1. A frequency characteristic shaping system using time varying means for transforming input frequency spectrums to output frequency spectrums, said system comprising a first input polyphase modulator unit, said input polyphase modulator unit comprising a first rotary switch having a plurality of poles, a second output polyphase modulator unit, said second modulator unit comprising a second rotary switch having a plurality of poles, means for coupling the input of said system to the wiper of said first switch, a plurality of paths connecting the poles of said input switch to the poles of said output switch, a filter means included in series in each of said paths, the wiper of said first switch rotating at a first angular velocity and maintaining contact with each pole for a period equal to the time period of said first angular velocity divided by the number of poles, the wiper of the second switch rotating at a second angular velocity and maintaining contact with each pole for a period equal to the time period of said second angular velocity divided by the number of poles, said second angular velocity being larger than said first angular velocity, said output wiper connected to a summation unit whereby said input frequency characteristics is modulated, filtered, re-modulated and summed to provide a translated frequency characteristic at the output of said summation unit.

2. The system of claim 1 wherein means are provided in said first switch for shorting every pole to ground except the pole coupled to the wiper.

3. The system of claim 1 wherein said rotary switches comprise N-poles and N-wipers, and wherein each of said wipers is coupled to a separate path.

4. The system of claim 3 wherein each of said paths coupled to the wipers of said first switch comprises a phase shift network and wherein the output of each of said phase shift networks lags the preceding one of said phase shift networks by $2\pi/N$ degrees, where N is the number of poles.

5. The system of claim 4 wherein said each of said wiper arms of said first switch lags behind the preceding arm by $2\pi/N$ degrees.

6. The system of claim 5 wherein said second modulator unit comprises an N-pole, N-way rotary sampling switch and N phase shift networks, each of said phase shift networks being connected between said summation unit and wiper arm of one of said N-poles, wherein each of said wiper arms lags behind preceding one by an amount of $2\pi/N$ degrees, and wherein each of said summation networks lags behind the preceding one by an amount $2\pi/N$ degrees.

7. The system of claim 6 wherein an erect translation of said input frequency spectrum is provided at the output of said system when wipers of said first and second switches are rotated in the same direction.

8. The system of claim 6 wherein an inverted translation of said input frequency spectrum is provided at the output of said frequency translation system when said wipers of said first and second switches are rotated in the opposite directions.

9. The system of claim 8 wherein said output frequency response is band limited by providing a third filter unit which is interposed between said input and said phase shift networks.

References Cited

UNITED STATES PATENTS

| | | | |
|---|---|---|---|
| 1,850,569 | 6/1928 | Schröter | 325—59 |
| 2,526,425 | 10/1950 | Schultheis | 325—59 |
| 2,852,606 | 9/1958 | Curry | 332—22 |
| 3,081,434 | 3/1963 | Sandberg. | |
| 2,527,649 | 10/1950 | Peterson | 325—58 |
| 3,406,383 | 10/1968 | McFarlane | 325—30 |
| 3,205,310 | 9/1965 | Schlichte. | |

FOREIGN PATENTS

| | | |
|---|---|---|
| 1,023,801 | 7/1958 | Germany. |

OTHER REFERENCES

P. M. Trasher, a New Method of Frequency Division Multiplexing and Its Integration With Time-Division Switching, IBM Journal, March 1965, Class 179/15 ART.

ROBERT L. RICHARDSON, Primary Examiner

A. J. MAYER, Assistant Examiner

U.S. Cl. X.R.

179—15; 333—70